US006810518B1

(12) United States Patent
Grimaud et al.

(10) Patent No.: US 6,810,518 B1
(45) Date of Patent: Oct. 26, 2004

(54) MIGRATION OF DIFFERENT SOURCE LANGUAGES TO AN EXECUTION MEDIUM (75) Inventors: Gilles Grimaud, Lille (FR); Jean-Jacques Vandewalle, Marseille (FR)

(73) Assignee: Gemplus, Gemenos (FR)

( * ) Notice: Subject to any disclaimer, the term of this patent is extended or adjusted under 35 U.S.C. 154(b) by 512 days.

(21) Appl. No.: 09/585,414

(22) Filed: Jun. 2, 2000

(30) Foreign Application Priority Data

Jun. 4, 1999 (FR) .............................................. 9907239

(51) Int. Cl.[7] ................................................ G06F 9/45
(52) U.S. Cl. ........................ 717/146; 717/139; 717/147
(58) Field of Search ................................ 717/139, 146, 717/147

(56) References Cited

U.S. PATENT DOCUMENTS

| | | | | |
|---|---|---|---|---|
| 4,823,257 | A | * 4/1989 | Tonomura | 717/147 |
| 5,586,323 | A | * 12/1996 | Koizumi et al. | 717/138 |
| 5,732,074 | A | * 3/1998 | Spaur et al. | 370/313 |
| 5,960,200 | A | * 9/1999 | Eager et al. | 717/147 |
| 6,009,363 | A | * 12/1999 | Beckert et al. | 701/33 |
| 6,138,140 | A | * 10/2000 | Yokote | 709/203 |
| 6,199,128 | B1 | * 3/2001 | Sarat | 710/301 |
| 6,308,317 | B1 | * 10/2001 | Wilkinson et al. | 717/146 |
| 6,321,376 | B1 | * 11/2001 | Willis et al. | 717/139 |

OTHER PUBLICATIONS

Folliot, B. et al, "*Virtual Virtual Machines*", XP–002135231, Project SOR, INRIA, Rocquencourt, B.P. 105, 78153 Le Chesnay Cedex, France, pp. 1–4.

Folliot, B. et al, "*A Dynamically Configurable, Multi–Language Execution Platform*", XP–002135232, INRIA, Rocquencourt, B.P. 105, 78153 Le Chesnay Cedex, France, pp. 1–5.

May, David, "*Virtual Binary Eases Program Recompilation*", 8181 New Electronics, Jul. 26, 1993 No., 7, Dartford, Kent, GB, p. 23.

Vandewalle, Jean–Jacques et al, "*Developing Smart Card–Based Applications Using Java Card*", XP–002135233, Gemplus Research Group, pp. 1–18.

* cited by examiner

*Primary Examiner*—Kakali Chaki
*Assistant Examiner*—Qamrun Nahar
(74) *Attorney, Agent, or Firm*—Burns, Doane, Swecker & Mathis, L.L.P.

(57) ABSTRACT

The invention automatically executes, in a single execution medium, a number of programs written in source languages to which respective execution media are dedicated, without constraining a programmer to a single source language for a respective execution medium type. Each program is compiled into a program expressed in an intermediate language representing a minimum subset of the source languages. In a data processing means such as a smart card, an execution medium is dedicated to the intermediate language. The intermediate language program is loaded with a respective programming library adapting the respective source language to the intermediate language in order to execute the intermediate language program in the execution medium.

16 Claims, 8 Drawing Sheets

*PRIOR ART*

FIG. 1

*PRIOR ART*

FIG. 2

*PRIOR ART*

FIG. 3

*PRIOR ART*

PJ:
```
/* Start of a JAVA program for a smart card: reception in the card of a message trans-
mitted by the server */
  public void process(APDU apdu)  //declaration of a JAVA procedure (card)
  {
    byte[] buffer;           // declaration of a working array
    buffer = apdu.getBuffer();  // buffer rcvs the message sent to card
    if(buffer[ISO.OFFSET_CLA] | = MyApplet_CLA  //command class correct?
      throw new ISOException(
        ISO.SW_CLA_NOT_SUPPORTED);  //if not, an error must be thrown
```

E1 —— JAVA -> pseudocode for Java execution medium.

PJC:
```
;" compiled process METHOD for a JAVA virtual machine"
.method public process(Ljavacard/framework/APDU;)V
.limit stack 3           ; number of working variables
.limit locals 3          ; number of local variables
.var 0 is this LClass1           ; declaration of variable this
.var 1 is apdu Ljavacard/framework/APDU ;     variable apdu
.var 2 is buffer [B                     ;     variable buffer
;--
aload_1                  ; loading on to the stack of the argument apdu
invokevirtual APDU/getBuffer()[B ;calling of the method getBuffer on apdu
astore_2                 ; result stored in buffer
aload_2                  ; loading of the variable buffer
iconst_0                 ; loading of the value OFFSET_CLA=0
baload                   ; loading of buffer[OFFSET_CLA]
sipush 204               ; loading of the value MyApplet_CLA=204
if_icmpeq Label1         ; comparison of operand stack values
new javacard/framework/ISOException ; creation of an exception instance
dup                      ; duplication of the stack top
sipush 28160      ; loading of initialization value = SW_CLA_NOT_SUPPORTED
invokespecial javacard/framework/ISOException/<init>(S)V ; initialize
athrow                   ; throw the exception
Label1:
Return           ; end of the method
.end method
```

E2 —— Conversion of pseudocode -> LI

PJLL:
```
; portion of disassembled LI program
.arg 1,{apdu : JAVA_APDU}        ; a single argument expected : apdu
.lcl 1,{buffer : JavaByteArray}  ; a local variable : buffer
.tmp 1                           ; a temporary variable (tmp0)
.cst 1,{0,204,28160}     3 constants: cst0=0, cst1=204, cst2=28160
buffer <- apdu getBuffer     ; 'buffer' rcvs the buffer of the apdu 'apdu'
tmp0 <- buffer getAt cst0    ; load the value of buffer position OFFSET_CLA
tmp0 <- tmp0 != cst1         ; compare the equality of buffer[OFFSET_CLA] and 204
jumpif tmp0,Label1           ; if they are equal, jump to Label1
tmp0<-JavaException create cst2 ; create an exception initialized to 28160
void <- JavaException throw tmp0 ;       the exception created
Label1:
return
```

FIG. 7

PC:
```
#include <ISOCard.h>          /* development library for card
define MYCARDAPPLY 0xCC /* Start of a C program for a smart card: reception in the card of a message transmitted
by the server */
void main(apdu *apdu)          /* declaration of a C procedure (card)
{ unsigned char *buffer;         /* declaration of working array
buffer = getApdu(apdu);        /*
if(buffer[ISO_OFFSET_CLA] !=MYCARDAPPLY) /* command class correct?
   CardExit(SW_CLA_NOT_SUPPORTED);
Return;
}
```

E1+E2, or E12 → Conventional C -> LI compilation

PCLI:
```
;
; portion of disassembled LI program
 .arg 1,{apdu : ISOCARD_APDUI}     ; a single argument expected : apdu
 .lcl 1,{buffer : UCharArray}      ; a local variable : buffer
 .tmp 1                            ; a temporary variable (tmp0)
 .cst 1,{0,204,28160)              ; 3 constants: cst0=0, cst1=204, cst2=28160 buffer <- apdu getBuffer          ; 'buffer' get the buffer of the apdu 'apdu'
 Tmp0 <- buffer getAt cst0         ; load the value in buffer position OFFSET_CLA
 tmp0 <- tmp0 |= cst1              ; compare the equality of buffer[OFFSET_CLA] and 204
 jumpif tmp0,Label1                ; if they are equal, jump to Label1
 void <- System CardExit cst2      ; throw the exception created
Label1:
 return
```

MIGRATION OF DIFFERENT SOURCE LANGUAGES TO AN EXECUTION MEDIUM

This disclosure is based upon, and claims priority from, French patent application No. 9907239, filed Jun. 4, 1999, the contents of which are incorporated herein by reference.

FIELD OF THE INVENTION

The invention relates to smart cards, also referred to as microprocessor cards, and more generally to microprocessor-based programmable open data processing means which are capable of being loaded with applications written in advanced programming languages. The invention is more particularly directed towards the fact that these different languages are heterogeneous in nature, which does not allow an application written in one particular language to be executed by any arbitrary programmable data processing means.

The invention is consequently also directed towards the openness of data processing means. The invention relates to the interoperability of applications written for programmable data processing means, such as the JAVA Card and other operating systems for smart cards. Interoperability is accompanied by requirements in terms of security.

BACKGROUND OF THE INVENTION

In the field of programmable smart cards, each programming source language used for writing an application intended to be loaded into a card is strongly linked to a particular execution medium generally having a software nature, such as a virtual machine, but also having a hardware nature, e.g. a microprocessor.

In order to be able to load a program into a smart card, the program written in a given source language is compiled, and then loaded into a smart card that is intended to receive programs written in the given source language. The card receives the compiled program and executes it by means of an execution medium specially dedicated to the execution of programs initially written in the given source language.

Figure 1:
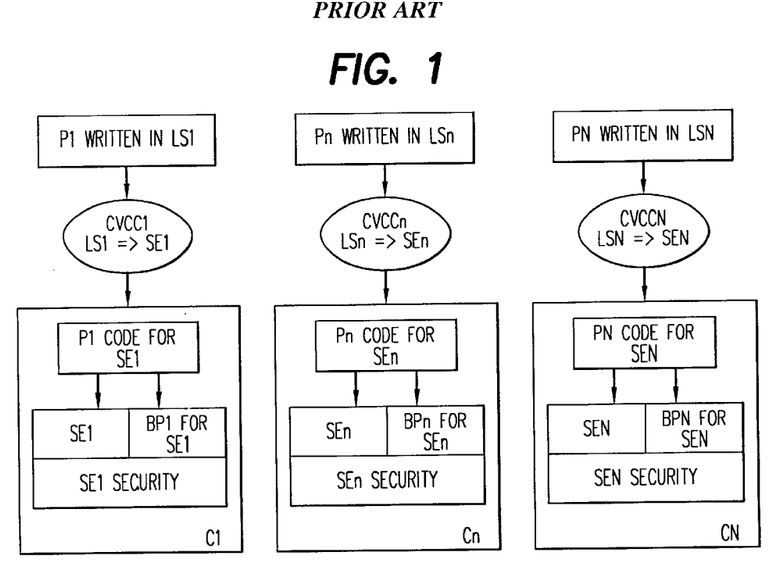
FIG. 1 is a diagram of the production and execution of a number of programs respectively written in different source languages for respective execution media.

As shown in FIG. 1, smart cards Cn each contain a respective execution medium SEn different from those SE1 to SEN of other smart cards C1 to CN. The integer n, where $1 \leq n \leq N$, designates a predetermined language from a number of source languages LS1 to LSN. Each card Cn can execute application programs Pn only if they are programmed in the respective source language LSn. Prior to compilation of the program to be loaded, the latter undergoes a code verification in order to check that the program to be loaded does not infringe security features provided by the execution medium SEn associated with the source language LSn.

In fact, in such a set of cards, a program Pn developed in a given source language LSn is intimately linked to the target execution medium SEn on the grounds that:

1) the data structures and the operations provided by the source language LSn are specialized in order to be compiled to a representation optimized in size and speed for the execution medium SEn dedicated to the source language LSn;
2) programming libraries BPn provided with the source language LSn are generally correlated with the source language and optimized for the execution medium SEn dedicated to the source language; and
3) the verification of the program Pn before it is loaded into a card Cn is intimately linked to the security features provided by the target execution medium SEn.

This strong link between a source language LSn and its execution medium SEn is expressed in a verification, compilation and loading chain CVCCn. This chain manages a transformation of a program Pn written in a high-level source language into a compact form ready to be executed efficiently by the execution medium SEn dedicated to the source language LSn.

The general problem at the heart of the invention is the linking of programs written in any one of the different source languages LS1 to LSN with different execution media SE1 to SEM, M being any integer equal to or different from the integer N. This general problem can be broken down into the following three sub-problems.

According to the first sub-problem SP1, it is desirable, for example, to make a program P written with a source language LSn run on an execution medium SEm dedicated to a given source language LSm, with the index m between 1 and M.

The second sub-problem SP2 consists in loading programs P1 to PN, written respectively with different source languages LS1 to LSN, into a common execution medium SEm capable of providing these different programs with an environment which is efficient in terms of memory size, execution speed, their programming libraries BP1 to BPM and their security features.

The third sub-problem SP3 aims to make different programs P1 to PN, written respectively in different source languages LS1 to LSN, coexist within a common execution medium SEm. For the third sub-problem, the security of the programs P1 to PN originating from different programming environments and placed in one and the same physical medium should be dealt with.

In order to solve the three sub-problems SP1, SP2 and SP3, which amounts to solving the interoperability of different applications written for example for programmable smart cards with preservation of security and protection and interaction mechanisms, persons skilled in the art could envisage the following three categories of solution which are, however, not entirely satisfactory.

Figure 2:
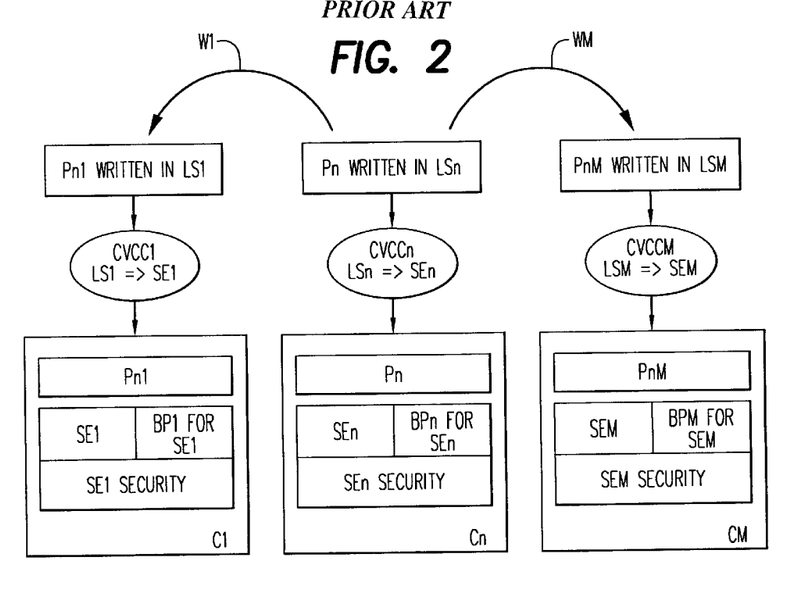
FIGS. 2, 3 and 4, are diagrams of first, second and third partial solutions to the interoperability of programs in different source languages, proposed by the prior art, respectively.

The first solution, the simplest and the most used, consists in rewriting a program Pn, written in a source language LSn dedicated to an execution medium SEn installed in a smart card Cn, as programs Pn1 and PnM written respectively for example in source languages LS1 and LSM dedicated to execution media SE1 and SEM installed in smart cards C1 and CM, as indicated by write operations W1 and WM in FIG. 2.

The first solution has as the main drawback an extensive and tedious manual task for a programmer, consisting in rewriting the algorithm of the program Pn as the programs Pn1, PnM which must be adapted to the different data structures and programming libraries BP1, BPM for the new source languages LS1, LSM. Furthermore, the security mechanisms provided by each of the new execution media SE1 and SEM require that the code of the rewritten program Pn1, PnM be recertified.

The first solution deals solely with the sub-problem SP1 and thus solves only very partially the problem of program interoperability. Furthermore, if another source language associated with an execution medium other than the execution media SE1, SEn and SEM appears in a new card, it is necessary to deal again with all the old programs written in the initial source language LSn in order to rewrite them with the other source language.

Figure 3:
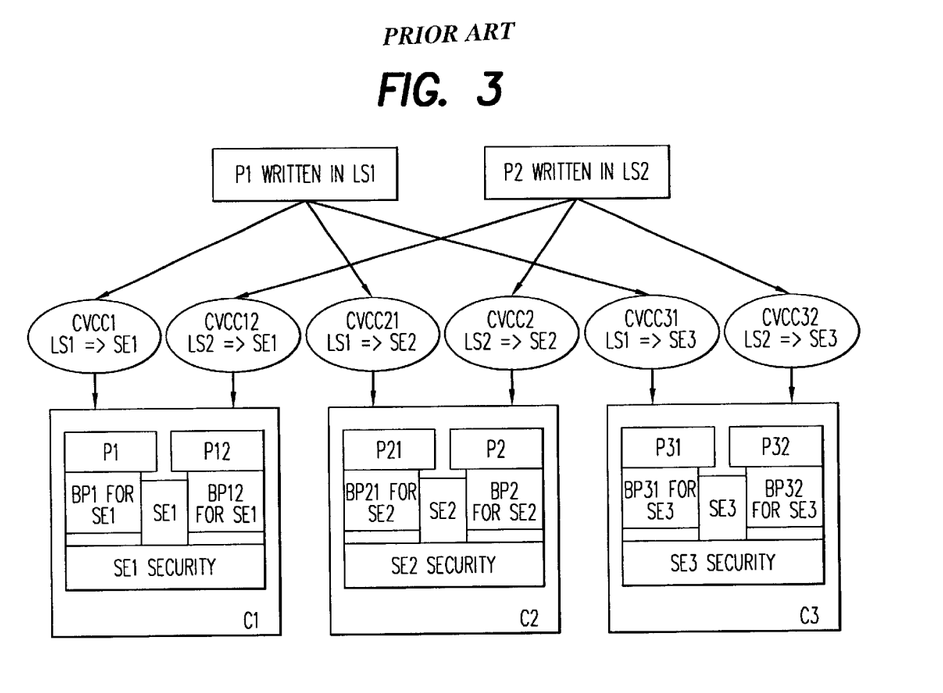

The second solution includes a cross-compilation. With reference to FIG. 3, let there be for example two programs P1 and P2 which are written in respective source languages LS1 and LS2 to which are initially dedicated two respective execution media SE1 and SE2 in two smart cards C1 and C2 after having undergone compilations in verification, compilation and loading chains CVCC1 and CVCC2, they can each be executed conventionally in the execution media SE1 and SE2. However, the programs P1 and P2 must be executed in the media SE2 and SE1 respectively, and also both of them in a third execution medium SE3 contained in a third smart card C3 and dedicated to a third source language LS3.

In order to execute the program P1, or P2, in target execution media SE2 and SE3, or SE1 and SE3, other than the execution medium dedicated to the initial source language LS1, or LS2, the program P1, or P2, undergoes compilations in additional verification, compilation and loading chains CVCC21 and CVCC31, or CVCC12 and CVCC32.

Compared with the first solution, the second solution no longer necessitates, on the part of a programmer, manual rewriting of the programs, but requires many verification, compilation and loading chains CVCC12, CVCC21, CVCC31, CVCC32 to be made available. More generally, for N source languages LS1 to LSN and M execution media SE1 to SEM, N*M verification, compilation and loading chains are necessary. These chains necessitate, by their number and complexity, a considerable hardware, software and human investment.

Besides this major drawback, the second solution has the following drawbacks:

- poor performance as regards memory size and execution speed of the programs thus generated, the execution media in which they are executed not being a priori suitably adapted to the data structures, operations and programming libraries of the source languages LS1 and LS2 used for writing these programs;
- production of verification, compilation and loading chains equal in number to the existing target execution media SE1 to SEM when a new source language appears, and conversely equal in number to the existing source languages LS1 to LSN when a new execution medium appears;
- for the deployment of programs, prior loading of all the downloading stations with the programs equipped with the compiled and certified codes for the different execution media SE1 to SEM, which makes the second solution still more complex and costly.

The second solution deals solely with the sub-problem SP1 but in an automated manner compared with the first solution, and thus solves only very partially the problem of interoperability. Furthermore, if another source language associated with an execution medium other than the execution media SE1 to SEM appears in a new card, it is necessary to pass all the initial programs P1 to PN through new verification, compilation and loading chains producing certified codes for the other execution medium.

Figure 4:
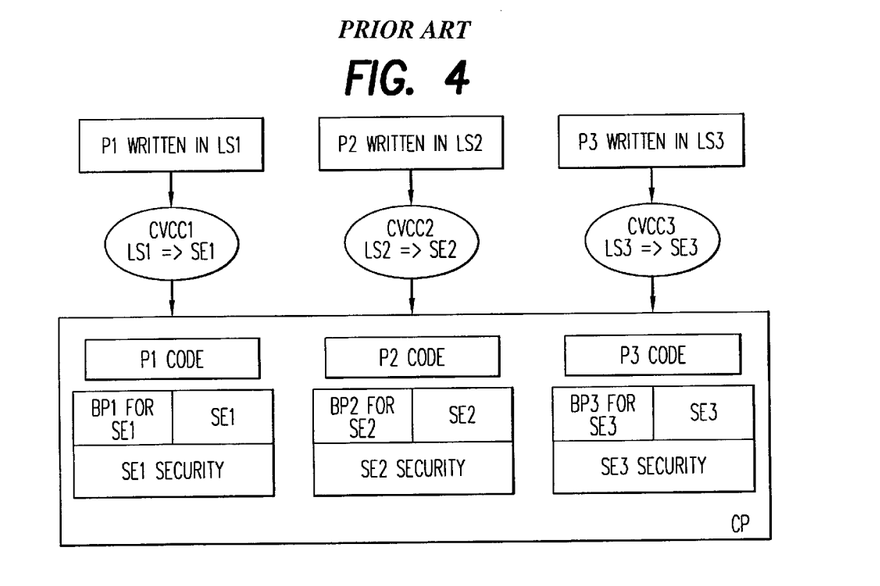

The third solution proposes smart cards CP which each contain a number of execution media, for example three execution media SE1, SE2 and SE3, as shown in FIG. 4. Thus, programs P1, P2 and P3 written respectively with different source languages LS1, LS2 and LS3 can be loaded into the card CP through the respective verification, compilation and loading chains CVCC1, CVCC2 and CVCC3. The card CP provides each program P1, P2, P3 with exactly the same functionalities as if it were loaded individually on a card having only the execution medium SE1, SE2, SE3 dedicated to the respective source language LS1, LS2, LS3.

The third solution retains advantageously the verification, compilation and loading chains CVCC1, CVCC2 and CVCC3 respectively associated with the source languages LS1, LS2 and LS3 and also allows the sub-problem SP2 to be solved.

Nevertheless, the third solution has the major drawback of being all the more impracticable at present since the number of different execution media to be installed in the card, each representing a significant amount of code, is large. This major disadvantage is also present in VVM architectures of the type described in the publication entitled "Virtual Virtual Machines" by Bertil Foliot and Ian Piumarta (September 1997) or in the publication entitled "A Dynamically Configurable Multi-language Execution Platform" of the same authors (1998). In this type of architecture, several execution support platforms are present in memory. These execution supports function as an additional layer of abstraction of the low level system primitives. However, the memory necessary to support this type of solution is not currently practical in a smart card. Even if it were available, it would be more useful to employ the memory to store additional data and programs, for example, rather than multiple execution media.

SUMMARY OF THE INVENTION

The main objective of the invention is to provide a method for automatically executing a number of programs written in different source languages in a single execution medium, without constraining a programmer to a single source language for a respective execution medium type. This main objective amounts to solving the three sub-problems defined above, SP1, SP2 and SP3, i.e. the interoperability of programs in different source languages, which none of the three solutions presented above solves completely.

To that end, the method of migration of a number of programs, written respectively in source languages to which respective execution media are dedicated, to a data processing means, comprises the steps of:

- compiling each program into a respective program expressed in an intermediate language representing a minimum subset of the source languages,
- providing, in the data processing means, a predetermined execution medium dedicated to the intermediate language, and
- loading the respective intermediate language program into the data processing means with a respective programming library adapting the respective source language to the intermediate language in order to execute the intermediate language program in the predetermined execution medium.

The invention is based on the search for an execution medium which is initially the lowest common denominator present in predetermined microprocessor-based data processing means execution media; for example the execution media are contained in known smart cards of different types, i.e. whose programs are written in different source languages. The invention therefore offers the advantages of the third solution presented previously, proposing that the set of all possible execution media be put in one microprocessor-based data processing means. But instead of requiring a considerable, perhaps even unachievable memory size, the invention installs only a reduced execution medium dedicated to a minimum, but flexible, intermediate language in each data processing means, such as a smart card. As such, the intermediate language is not associated with any particular source language, and serves as a base language for serving as a target for a number of source languages. The memory required for installing the intermediate language is thus reduced, and consequently the execution of a program is faster than in the third solution proposed above.

The invention thus uses the combination of:

an intermediate language capable of representing both the programs written in different languages and the specific security features and programming libraries necessary for their correct operation, and an execution medium dedicated to the intermediate language, but capable of being reconfigured in order to best adapt to the requirements of each language, both in terms of working environment and in terms of checking the security of the applications.

According to a variant of the invention, the compiling step can comprise the steps of:

compiling the program into a compiled program in a machine language to which the respective execution medium is dedicated, and converting the compiled program into the respective program expressed in intermediate language.

This variant can be of interest for a developer of a program from the compiled result of a program for producing the code in intermediate language. The tool which allows this operation is a converter. It replaces the instructions of the respective execution medium associated with the source language with operations written in intermediate language.

According to another aspect of the invention, the method can comprise a step, before the loading step, for extracting validation information from the respective program in intermediate language, and a step, after the loading step, for verifying the extracted validation information in the predetermined execution medium.

According to another variant, the predetermined execution medium can be similar to one of the execution media. Although overall less advantageous than the basic embodiment of the invention, this variant can be of interest when the source languages are languages which have undergone similar developments and modifications.

Preferably, the intermediate language is extendable, while the predetermined execution medium is extendable or not extendable. At least one of the source languages and the intermediate language are advantageously object-oriented languages.

In practice, the method can comprise a step of reading of the characteristics of the predetermined execution medium by a server which then performs the compiling step.

The data processing means can be, for example, a smart card. The smart card can be a subscriber identity card included in a mobile radiotelephone terminal.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which:

FIG. 6 shows the steps of compiling and converting a program, written in a known language, into an intermediate language according to the invention;

DETAILED DESCRIPTION

Figure 5:
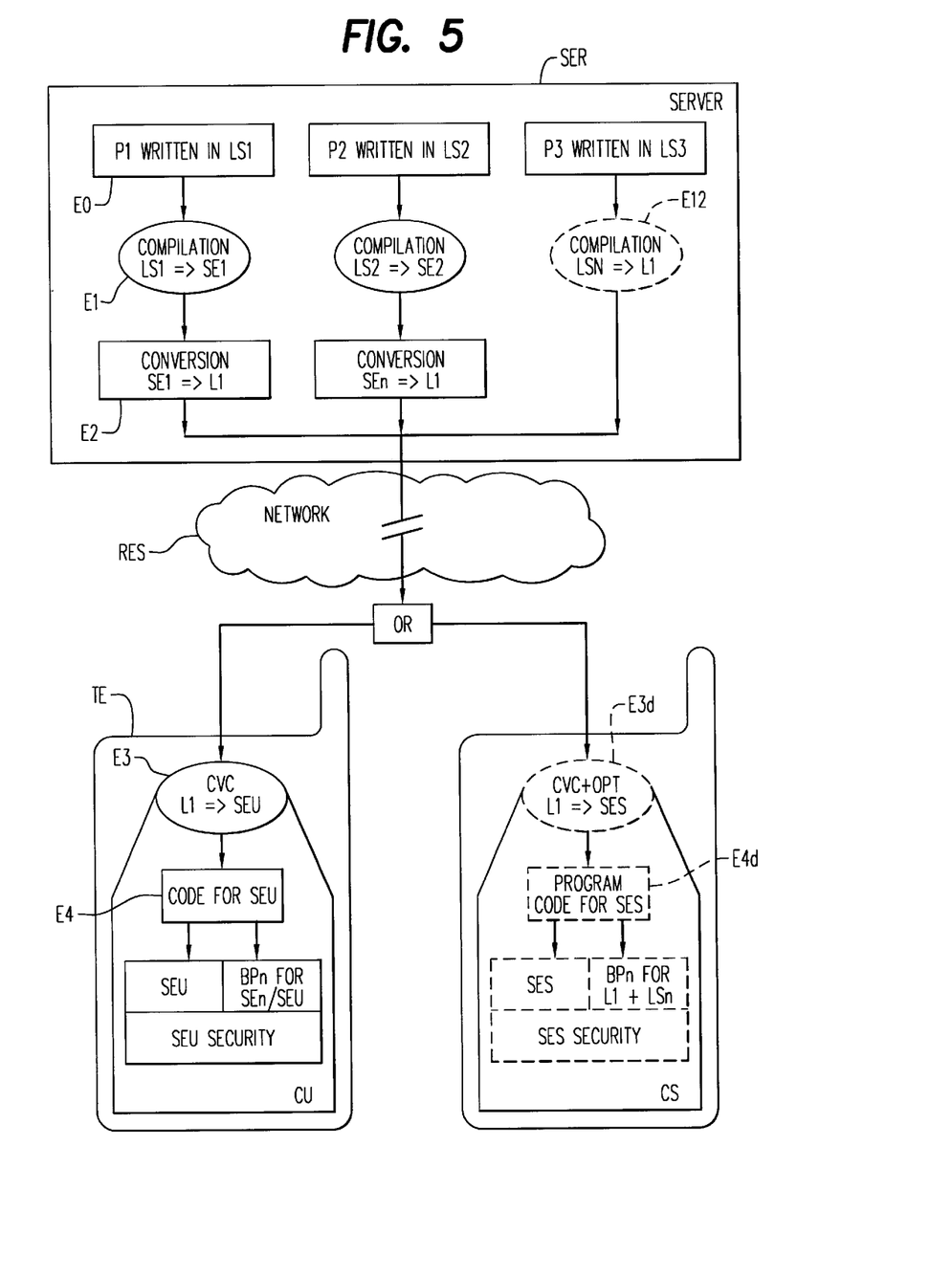
FIG. 5 is a diagram of the production and execution of a number of programs written in different source languages to be executed in an execution medium dedicated to an intermediate language and contained in a microprocessor card, according to a preferred embodiment of the invention and variants thereof.

With reference to FIG. 5, N application programs P1 to PN are capable of being written respectively in source languages LS1 to LSN which are a priori different, in an application server SER. The source languages are sometimes referred to as "advanced languages" or "high-level languages". The application programs P1 to PN could be, for example, associated with different respective services available via a smart card.

According to a preferred embodiment of the invention, the migration method has the objective of making any arbitrary program Pn, written in the respective source language LSn, migrate to a universal execution medium SEU according to the invention, contained in a corresponding data processing means, such as a "universal" programmable smart card CU, as defined below.

As illustrated on the left in FIG. 5, the migration method comprises essentially four steps E1 to E4, after an initial step of development and provision E0 of a program Pn in the respective source language LSn, with $1 \leq n \leq N$.

The programs P1 to PN are developed in a server SER connected to a terminal TE containing the card CU through a telecommunications network RES. For example, the terminal TE can be a bank terminal connected to the server by leased or dedicated lines of the network RES; according to another example, the terminal TE can be a GSM type mobile radiotelephone terminal connected to the server SER by a digital cellular radiotelephone network RES, the server being connected to mobile service switching centers (MSCs) through the signalling network of the radiotelephone network, and the card CU being a SIM (Subscriber Identity Module) type subscriber identity card that is removable from the terminal TE.

At step E1, the server SER interrogates the execution medium SEU in the card CU so as to read therefrom and record already present characteristics of the execution medium. Then the program Pn in source language LSn is compiled into a compiled program PCn expressed in a machine language to which the respective target execution medium SEn is dedicated. A compiler carrying out the step E1 is a program installed in the server SER. Then, at step E2, the compiled program PCn is converted into an intermediate language LI according to the invention. Like the compiler, a language converter is a program which is implemented in the server SER and carries out the step E2.

The intermediate language LI has notably the following two properties:

extendability: the language LI is capable of expanding the field of elementary commands in order to efficiently express programs originating from other languages;

strong typing: as is known, code security mechanisms by means of typing constitute the finest grain possible for a security check; the security features of each language are then specified from the initial model present in the card; the intermediate language LI allows an extendable typing check in the manner of the types or classes of object languages.

The intermediate language LI contains only a very limited number of instructions constituting a minimum subset representing the machine languages of the different execution media SE1 to SEN. An additional programming library is used by the language converter at step E2 in order to avoid each elementary operation for the execution system SEn being replaced by a set of instructions for the universal execution medium SEU. This precaution limits the risks of increasing the volume in memory of the programs loaded into the card CU.

FIG. 6 shows, according to a first example, the steps E1 and E2 for a source language program, such as a code segment PJ expressed in the object-oriented source language JAVA relating to reception in the card of a message transmitted by the server SER.

The step E1 performs conventionally the compilation of the segment PJ into a compiled binary program PJC in a format referred to as pseudocode (Byte Code) which is capable of running in an execution medium SEJ, i.e. a microcomputer having implemented the concept of the JAVA virtual machine. Conventionally, each instruction in the JAVA language gives rise to a number of instructions in the virtual machine language.

Then, at the step E2, the conversion mechanism is not limited to an instruction-by-instruction substitution of the JAVA pseudocodes by pseudocodes of the intermediate language LI, but converts a succession of elementary operations in the compiled program PJC into a different intermediate language sequence PJLI, determining function call arguments for example. With this conversion being performed outside the card CU, it is possible to install optimization and transformation techniques used in the compilers. The conversion at the step E2 guarantees the efficiency of the code in the language LI transmitted to the card, whatever the source language that is used. Furthermore, the language conversion contributes towards producing elements proving the correct operation of the language LI which the card CU uses for checking the viability of the program; at the end of the step E2, the language converter provides typing information useful to the card for verifying the viability of the program.

Figure 7:
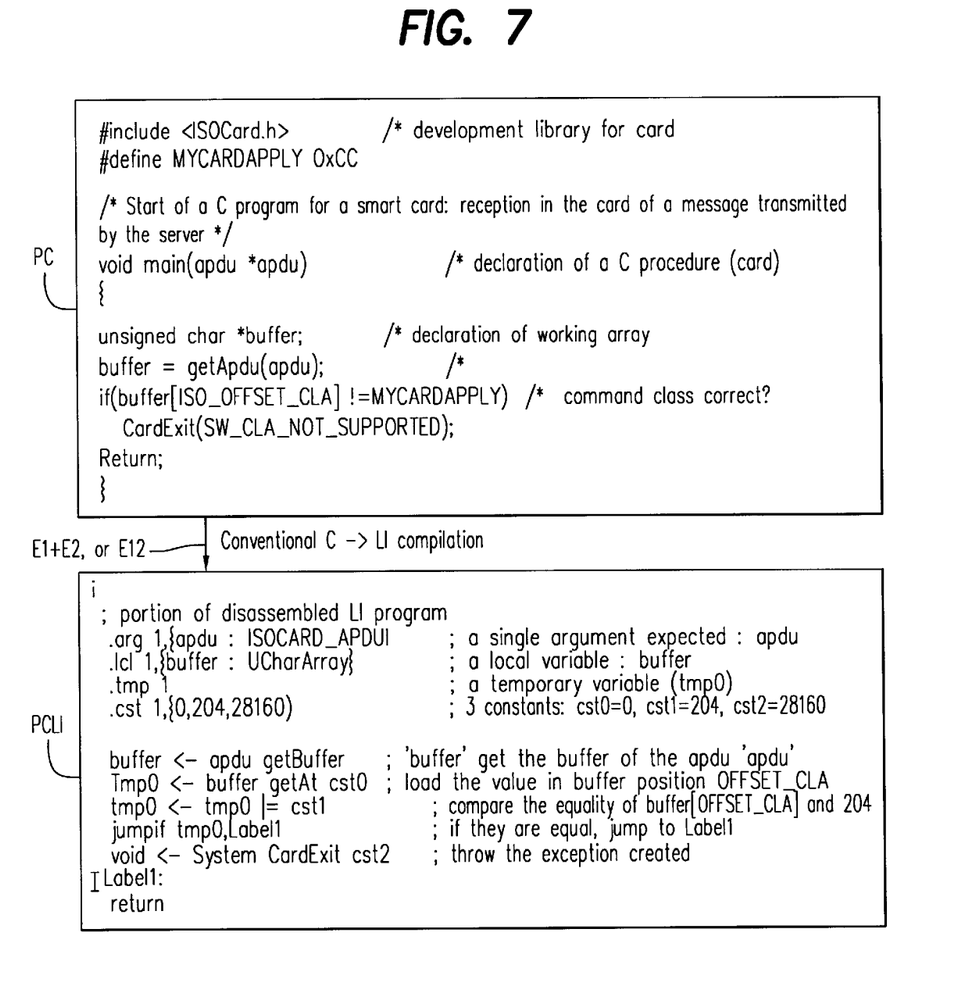
FIG. 7 is a step of compiling a program written in a known language, similar to the program of FIG. 6, directly into intermediate language.

According to a second example, FIG. 7 shows a code segment PC expressed in the C language and corresponding to a declaration of a working array, as for the JAVA language code segment PJ shown in FIG. 6. After the compilation step E1 for conventionally compiling the segment PC intended for an execution medium dedicated to the machine language capable of executing a C language program, the step E2 converts the corresponding machine language segment into a sequence PCLI expressed in the intermediate language LI.

In the intermediate language LI, the sequence PCLI is identical to the sequence PJLI: they comprise the same variables and constants as well as commands and operations expressed in the same way, except for the throwing of an exception at the end of the sequence specific to the initial source language.

The intermediate language LI according to the invention is thus adaptable. Any operation or command according to the examples shown in FIGS. 6 and 7 is expressed in the form of a message applied to an object. As for a known object-oriented language, new messages in the intermediate language can be defined at any time.

FIG. 5 shows a second variant of the first embodiment, illustrated in the upper right in dotted lines, relating for example to the production of the program PN initially expressed in a source language LSN. For this second variant, the compilation and conversion steps E1 and E2 are replaced by a compilation step E12 which compiles the program PN in source language LSN into a compiled program directly expressed in the intermediate language LI which is next verified and loaded into the smart card CU at the step E3.

According to the example shown in FIG. 7, the step E12 directly converts the C language segment PC into the sequence PCLI in language LI.

Next, returning to the step E3 in FIG. 5, the program expressed in intermediate language LI follows a verification and loading chain CVC for it to be verified and downloaded into the target smart card CU. The chain CVC is at least partly and preferably totally installed in the card CU. The other part of the chain CVC concerns notably the dynamic verification of the execution of the intermediate language program and is installed either in the server SER, or in a terminal TE receiving the card.

A verification and/or adaptation mechanism in the card CU at the step E3 transforms the code received in the card and expressed in intermediate language LI into the form of a binary program directly executable in the intermediate language. Validity information for the intermediate language program, relating notably to security, typing and containment, can be extracted from the program and established in the terminal TE during the step E3 and verified by the card after loading of the program into the card. If the verification fails, the program is invalidated. This verification provides the efficiency of the environment in which the program is used, in accordance with the sub-problem SP2.

The transformations performed upon loading at the step E3 can be minimal and reduced to a link editing mechanism specific to the medium of the smart cards.

Figure 8:
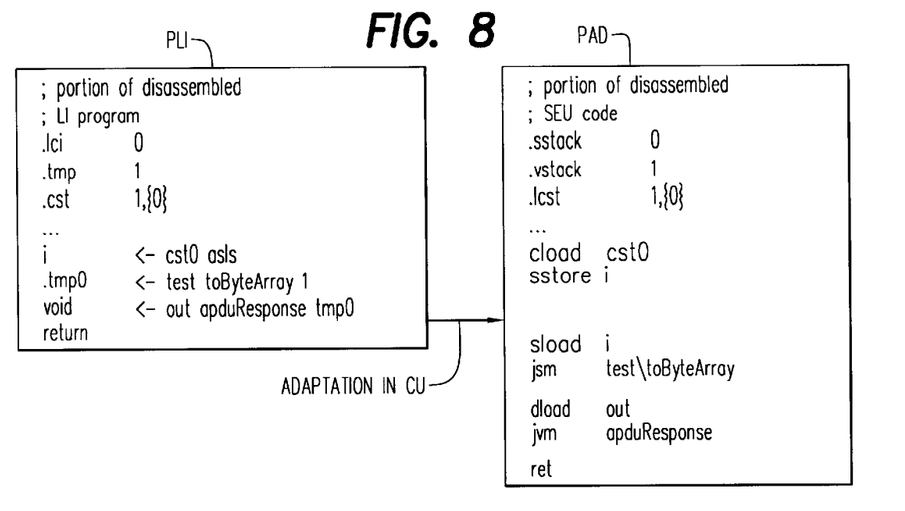
FIG. 8 shows a step of adaptation of a sequence in intermediate language before execution according to the first embodiment.

The aim of the step E3 is to complete, in situ in the card, the work performed at the steps E1 and E2, or at the step E12. The verification and/or adaptation mechanism completely converts the received code and transforms it into a program executable by the universal execution medium SEU in the card. The aim of this conversion is to make the code more efficient by subjecting it statically to security checks which, when executed dynamically, strongly penalize the execution time of the programs. In practice, the on-board adaptation mechanism embedded in the card CU can carry out significant work which creates a program directly executed by the execution medium SEU, i.e. the microprocessor present in the card. FIG. 8 illustrates an example of the processing performed by the adaptation mechanism at the step E3 from an intermediate language sequence PLI, similar to the sequence PJLI, PCLI, in order to provide an adapted sequence PAD.

At step E4, the program in intermediate language LI is installed in the card CU which is intended to directly support the intermediate language LI. The card CU has a specific adaptation mechanism.

The smart card CU is programmable, i.e. it receives programs throughout its life cycle, and contains the execution medium SEU dedicated to the intermediate language LI. Thus the programs P1 to PN written in the various source languages LS1 to LSN coexist within one and the same card CU which is not specifically dedicated to one of the source languages LS1 to LSN, but which is capable of accommodating different programs written in different source languages, which solves the sub-problem SP2.

The universal execution medium SEU contains only a restricted subset of the execution media SE1 to SEN of the initial programs P1 to PN. The step E3 loads programming libraries BPn at the same time as each program in the intermediate language LI in order to adapt, at the step E4, the source language LSn to the intermediate language and thus execute the initial program Pn in the intermediate language. Security features specific to the intermediate language are imported "over" those existing in the universal execution medium SEU. The architecture of the universal execution medium SEU in the card CU gives consideration to this aspect in order to provide the accommodated programs with an environment efficient in memory size and execution speed while preserving the security features, which solves the sub-problem SP3.

The universal execution medium SEU placed in the card CU and supporting the execution of the intermediate language LI is:
   adaptable for accepting new programming libraries for each new source language supported in order to execute the program initially written in the new language in its software environment;
   reliable for supporting the security mechanisms by checking of the types handled by the programs; and also for accepting the definition of new types in order to describe associated security mechanisms upon the loading of new programming libraries.

Figure 9:
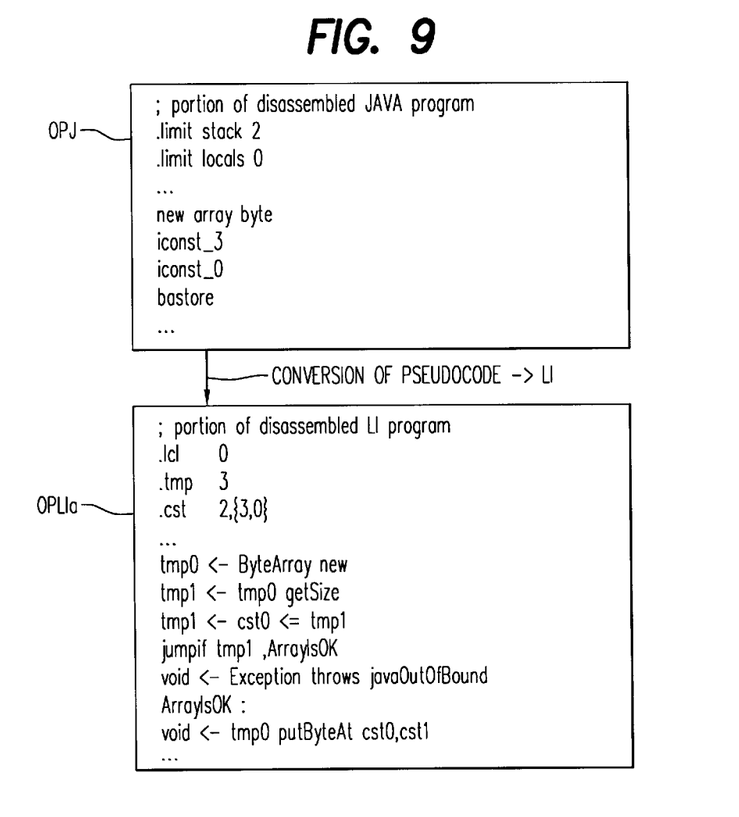
FIGS. 9 and 10 show conversions of a sequence written in a virtual machine language into sequences without and with extension of the intermediate language, respectively.
Figure 10:
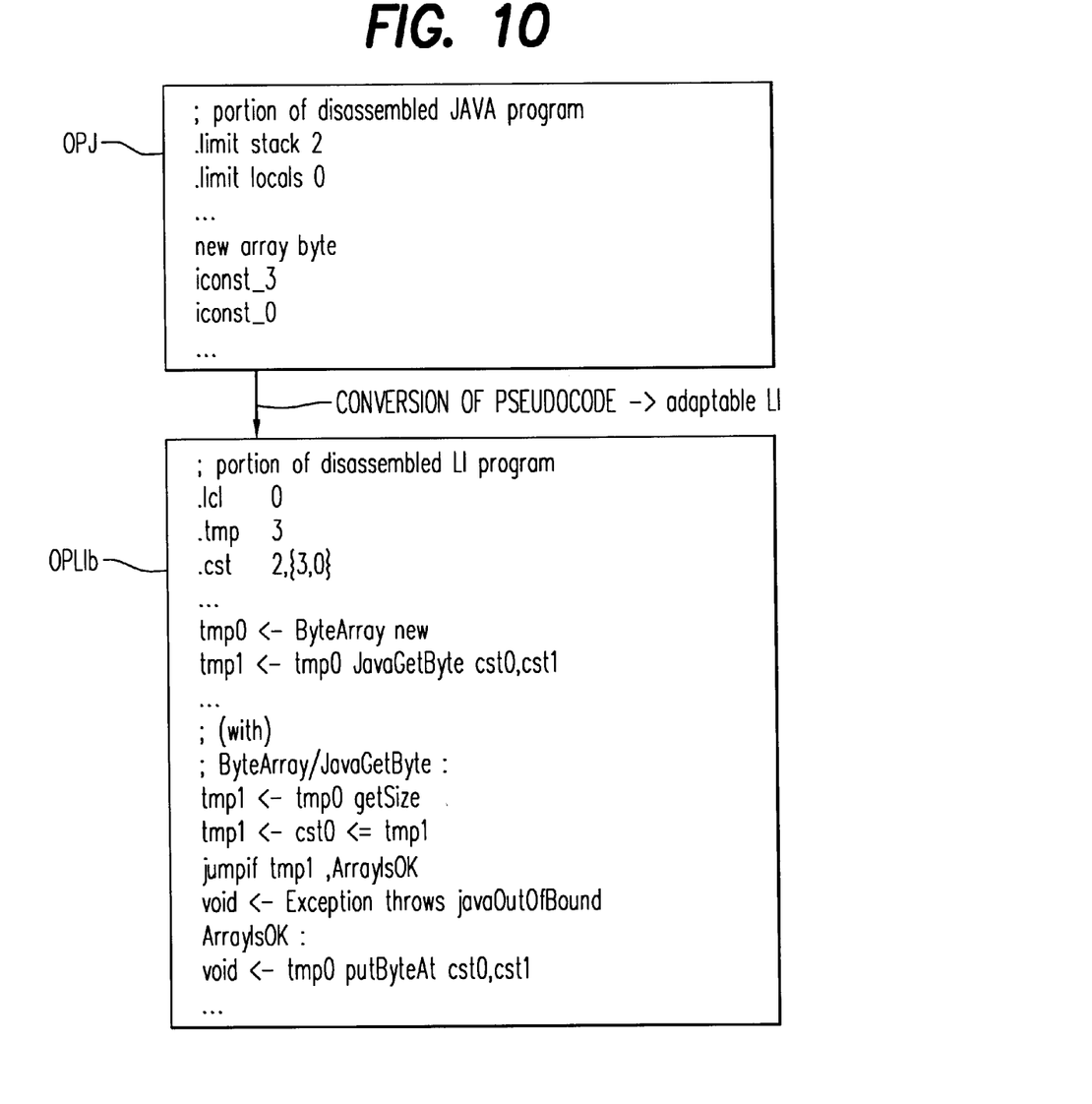

At the step E4, the advanced program interpretation mechanism concerns the execution medium itself. The software and/or hardware execution medium SEU is used as a target for the generation of each executable program, in order to respond to the concerns of the sub-problems SP2 and SP3. Preferably, the execution medium SEU comprises a set of instructions different from that which it uses initially. This function makes it possible in the absolute to completely redefine the universal execution medium SEU so that it can directly interpret the code originating from a particular language. The extension mechanism which the step E4 aims at favors, for example, code portions originating from a given language and makes it possible especially to install operations which define a semantics different from that provided by the initial universal execution medium SEU of the card CU. The extension mechanism relates for example to an elementary instruction for accessing an array, which in the JAVA language gives rise to an exception when it goes outside the limits of the array, whereas in the initial installation of the intermediate language LI, the elementary instruction gives access to any position in the array. One simple solution consists of transforming a JAVA language operation OPJ for accessing an array into a sequence of operations OPLIa in the intermediate language LI, with no extension of the latter, as shown in FIG. 9. In order to avoid this unnecessary enlargement of the code which is undesirable in the card, an elementary instruction which exactly achieves the equivalent semantics to the JAVA pseudocode (Byte Code) is defined in the universal execution medium SEU, as shown in lines 7 to 10 in a sequence of operations OPLIb in FIG. 10.

According to a variant of the invention, steps E3 and E4 are replaced by steps E3d and E4d shown on the right of FIG. 5. The target of this embodiment at is a specialized execution medium SES having for example a known hardware and, if need be, software architecture similar to one of the initial execution media SE1 to SEN dedicated to the source language LS1 to LSN.

At step E3d, a verification and loading chain CVCd is expanded by an optimization mechanism OPT which generates an efficient native final code which is optimum outside the card. The security constraints are preferably relaxed since the programs are produced for specific smart cards CS once and for all and pass through known industrial sector reliability checks.

Figure 11:
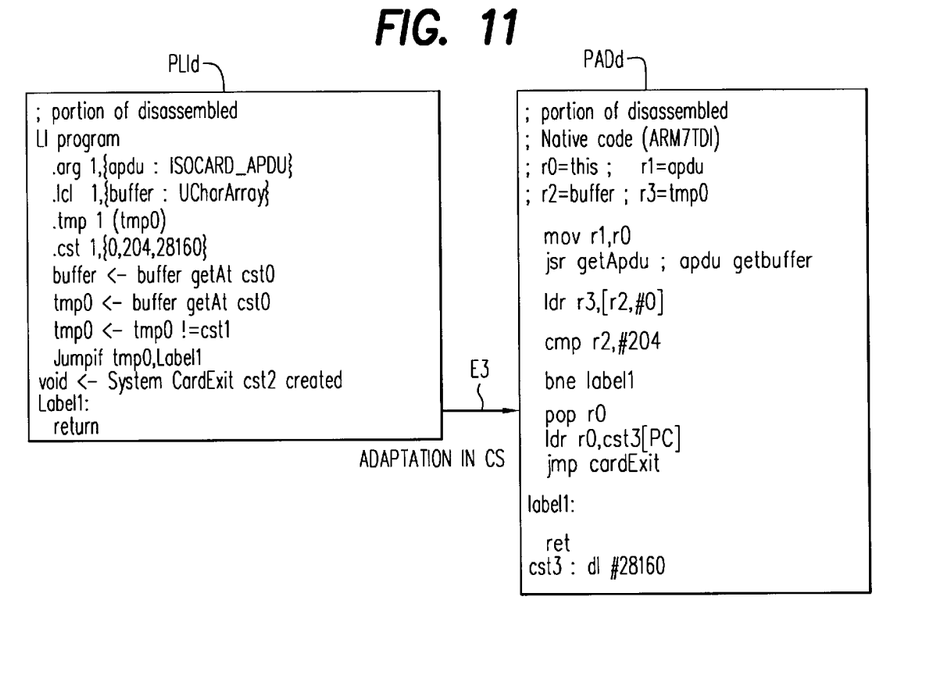
FIG. 11 shows an adaptation of a sequence in intermediate language before execution, according to a variant of the invention.

FIG. 11 shows an adaptation at the step E3d between a sequence PCId in intermediate language LI into an adapted sequence PAd.

At step E4d, a set of programming libraries BPn, BPdn are carried by the execution medium SES so that the program originating from the program Pn in source language LSn runs in its environment.

The execution medium SES according to this variant requires the implementation of M verification and loading chains, and therefore the writing of a new chain CVC dependent upon a new language.

This variant is less advantageous than the embodiment with a "universal" execution medium SEU. The execution medium SES remains dependent on a predetermined execution medium SEn, and the inadequacy between the programming library BPn of the source language LSn and that expected for the execution medium SES programmed originally for another language requires a larger memory capacity and leads to lower efficiency.

What is claimed is:

1. A method of migration of a number of programs, written respectively in source languages to which respective execution media are dedicated, to a data processing means, comprising the steps of:
   compiling each program into a respective program expressed in an intermediate language representing a minimum subset of the source languages,
   providing, in the data processing means, a predetermined execution medium dedicated to the intermediate language, and
   loading the respective intermediate language program into the data processing means with a respective programming library adapting the predetermined execution medium to the intermediate language in order to execute the intermediate language program in the predetermined execution medium.

2. A method according to claim 1, in which the compiling step comprises the steps of:
   compiling the program into a compiled program in a machine language to which the respective execution medium is dedicated, and
   converting the compiled program into the respective program expressed in the intermediate language.

3. A method according to claim 2, further including the step, before the loading step, of extracting validation information from the respective program in the intermediate language, and the step, after the loading step, of verifying the extracted validation information in the predetermined execution medium.

4. A method according to claim 1, in which the predetermined execution medium is one of the execution media.

5. A method according to claim 1, in which the intermediate language is extendable.

6. A method according to claim 1, in which at least one of the source languages and the intermediate language are object-oriented languages.

7. A method according to claim 1, further including the step of reading the characteristics of the predetermined execution medium by a server which then performs the compiling step.

8. A method according to claim 1, in which the data processing means is a smart card.

9. A method according to claim 8, in which the smart card is a subscriber identity card included in a mobile radiotelephone terminal.

10. A method according to claim 1, further including the step, before the loading step, of extracting validation information from the respective program in the intermediate language, and the step, after the loading step, of verifying the extracted validation information in the predetermined execution medium.

11. A method for storing multiple application programs for execution in a smart card, comprising the steps of:

compiling each of a plurality of application programs, that are respectively written in different source languages, into corresponding programs in an intermediate language that is the same for each of said corresponding programs;

loading each of said corresponding programs into a smart card having an execution medium which supports programs in said intermediate language; and loading programming libraries into said smart card that are respectively associated with the source languages in which said application programs are written and that adapt the associated source language for execution in the intermediate language.

12. The method of claim 11, wherein said compiling step comprises the steps of:

compiling an application program into a program in a machine language for an execution medium that is associated with the source language of the application program; and converting the machine-language program into a corresponding program in the intermediate language.

13. The method of claim 11 wherein said intermediate language is an object-oriented language.

14. The method of claim 13 wherein at least one of said source languages is an object-oriented language.

15. The method of claim 11 wherein said loading step includes the step of converting a corresponding program in the intermediate language into a binary representation for direct execution by said execution medium.

16. The method of claim 15 wherein said loading step further includes the step of verifying the security and typing of the corresponding program.

* * * * *